United States Patent [19]

Hess, III

[11] Patent Number: 4,859,826
[45] Date of Patent: Aug. 22, 1989

[54] SIMULTANEOUSLY CUTTING AND WELDING SHEET METAL USING LASER ENERGY

[75] Inventor: Albert J. Hess, III, Westminster, Md.

[73] Assignee: Laser Applications, Inc., Westminster, Md.

[21] Appl. No.: 204,274

[22] Filed: Jun. 9, 1988

Related U.S. Application Data

[62] Division of Ser. No. 74,864, Jul. 17, 1987, Pat. No. 4,798,931.

[51] Int. Cl.$^4$ ................................................ B23K 26/00
[52] U.S. Cl. ........................... 219/121.63; 219/121.67; 219/121.84
[58] Field of Search ............... 219/121.63, 121.64, 219/121.67, 121.72, 121.84, 121.6, 121.85

[56] References Cited

U.S. PATENT DOCUMENTS

| | | | |
|---|---|---|---|
| 3,469,076 | 9/1969 | Suslawsky | 219/383 |
| 3,604,890 | 9/1971 | Mullaney | 219/121.72 X |
| 3,965,328 | 6/1976 | Locke | 219/121.67 |
| 3,981,230 | 9/1976 | Lee | 93/33 H |
| 4,010,345 | 3/1977 | Bangs et al. | 219/121.6 |
| 4,128,753 | 12/1978 | Sharp | 219/121.6 |
| 4,149,918 | 4/1979 | Cislak | 156/88 |
| 4,324,972 | 4/1982 | Furrer et al. | 219/121.84 |
| 4,332,999 | 6/1982 | Wittke | 219/121.69 |
| 4,377,735 | 3/1983 | Minamida et al. | 219/121.85 |
| 4,447,701 | 5/1984 | Brown | 219/121.67 |
| 4,461,947 | 7/1984 | Ward | 219/121.84 |
| 4,465,919 | 8/1984 | Roder | 219/121.67 |
| 4,500,382 | 2/1985 | Foster | 156/272.8 |
| 4,533,814 | 8/1985 | Ward | 219/121.64 |
| 4,539,463 | 9/1985 | Piccioli et al. | 219/121.67 |
| 4,546,230 | 10/1985 | Sasaki et al. | 219/121.64 |
| 4,549,058 | 10/1985 | Del Mastro et al. | 219/121.63 |
| 4,564,736 | 1/1986 | Jones et al. | 219/121.6 |

FOREIGN PATENT DOCUMENTS 0212888 12/1983 Japan ............................. 219/121.64

Primary Examiner—C. L. Albritton
Attorney, Agent, or Firm—Roylance, Abrams, Berdo & Goodman

[57] ABSTRACT

A method of simultaneously cutting and welding metal, especially relatively thin sheets of metal, utilizing laser energy. The invention uses surface tension in the globule created at the site of the impingement of the laser beam on the work to form finished edges on both sides of the line of cut. A laser beam surrounded by a thin shield of inert gas is used, the gas removing some of the molten metal but leaving sufficient to form the beads which comprise the finished edges on both sides of the cut, and also preventing oxidation of the beads.

7 Claims, 4 Drawing Sheets

LASER BEAM
20
22
O₂
GAS JET ASSIST INLET
24
WORK

O₂

2E.
O₂
2E.

26

O₂
28

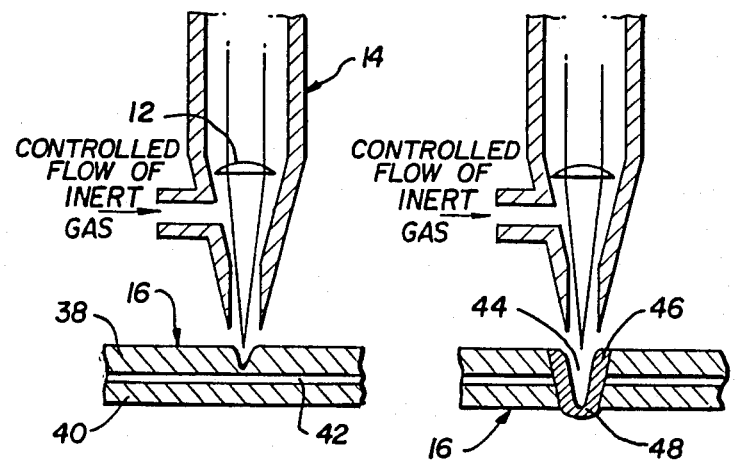
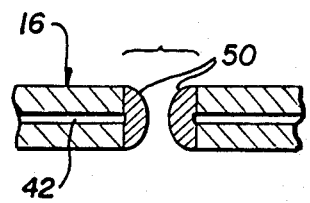
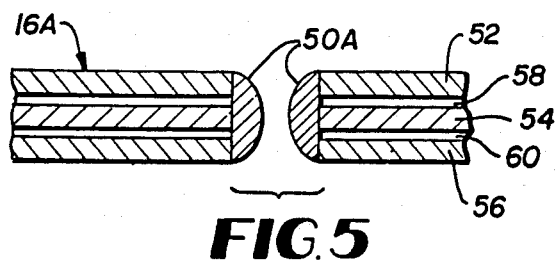
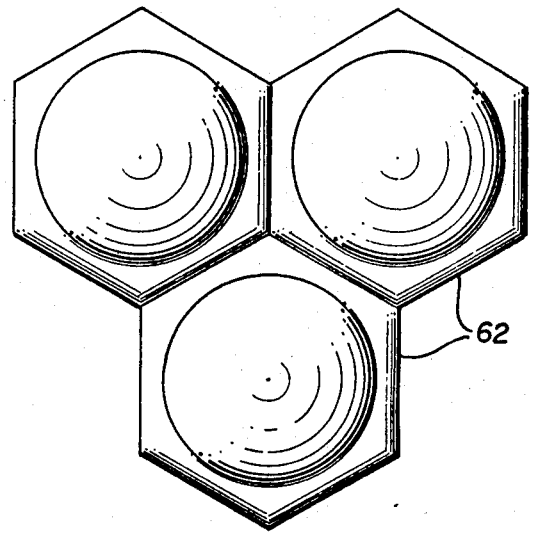
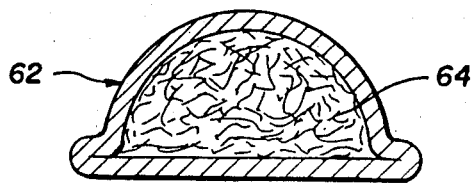

SIMULTANEOUSLY CUTTING AND WELDING SHEET METAL USING LASER ENERGY

This is a continuation division of application Ser. No. 74,864, filed July 17, 1987, now issued as U.S. Pat. No. 4,798,931 on Jan. 17, 1989.

FIELD OF THE INVENTION

This invention relates generally to the field of metalworking, and more in particular it relates to use of laser energy in such metalworking. It is known in the prior art to use laser energy to cut metal and to weld metal, but only to do each operation separately and independently. The present invention is a substantial step forward in this art in that it provides methods and apparatus for simultaneously welding and cutting multiple layers of sheet metal in a highly efficient manner using state-of-the-art components.

BACKGROUND OF THE INVENTION

The present invention was developed in the environment of the fabrication of relatively complex three-dimensional articles made up of multiple layers of relatively thin metal, and in particular such layers of stainless steel. Such articles find utility, for example, as heat shields in automotive and aircraft applications. In the fabrication of such articles, since the shapes are relatively complex, cutting and welding must occur in three dimensions and involve many turns, bends, and the like. In addition, such articles often have entrapped areas which can be filled with insulating material, such as fiberglass, and it is necessary to provide improved means to fabricate such articles. There are sometimes only two layers to be cut and welded, and sometimes three or four layers. Because of these different thicknesses and other factors, complex fabrication techniques are dictated by the shape of the articles.

Prior to the present invention, these parts were made laboriously by hand, by folding over the edges, and then crimping them to make finished edges along the outline of the part. This was highly labor-intensive, and thus correspondingly expensive. In addition, because of the repetitive and mind-deadening quality of this low-level work, the parts were more susceptible to errors and thus rejects than the same parts when made in accordance with the present invention.

The present invention when used in fabricating such parts completely eliminates all of these hand operations having to do with crimping, folding, and bending. The parts are simply assembled, laid up as it were, and then simultaneously cut and welded to produce smooth, finished edges.

In addition, the invention accommodates the fact that the edge portions where the cutting and welding is to take place contains only metal, but closely spaced thereto are areas protected by only one relatively thin layer of metal under which there may be insulating material. The invention must be controlled in such a manner as to not cut into or otherwise diminish the insulating qualities of the insulating portions of the articles being made. This is easily accomplished using state-of-the-art computer-controlled fabricating equipment.

The present invention utilizes very little in the way of new equipment, but rather it is primarily an improved application of state-of-the-art equipment. More specifically, in the prior art conventional manners of cutting metal using a laser, a narrow stream of oxygen is often used. This high speed jet of oxygen is used to literally "blow away" the molten metal created by the laser to thereby make the cut.

On the other hand, in conventional welding using laser energy, a relatively wide stream of an inert shielding gas is used at relatively low pressure in order to be sure that the work site is shielded from oxygen and that no metal is blown away. The molten metal is used, of course, to actually make the weld.

As set forth in more detail below, the present invention utilizes both of these techniques in a unique manner to produce its advantageous simultaneous welding and cutting of sheet metal.

The present invention is to be distinguished from laser technology as applied to the handling of non-metallic materials, especially plastics. The use of lasers in simultaneously cutting and welding plastics has been established; such is not the case with metals.

The present invention, as discussed in more detail below, depends upon the creation of a globule or pool of molten metal, some of which is blown away and the remainder of which is used to weld. Vaporization of this material is generally undesirable since it could widen the cut and result in the creation of rough edges and lack of control of the cutting and welding operation. When working with plastics, the vaporization of the material directly under the laser results in melting of additional material outboard on both sides of the cut, and that melted material can if desired result in some degree of welding while cutting.

Another important difference of the invention as applied to working metal as compared to prior art use of laser technology in working plastic is that the sheets of plastic material to be operated upon must be in tight and intimate contact. If the plastic sheets were not in tight and intimate contact, the heat of the laser would simply cause them to curl inwardly towards each other into the cut created between them and also into the space between the layers. The present invention provides for space between the layers in a controlled manner, and this space between the layers aids in the advantageous manner of operation of the present invention.

The present invention is also to be distinguished from other kinds of prior art in the laser field wherein a smaller piece of material, and it may be metal, is cut off and the remaining end is simultaneously welded in place in a larger piece of material. There are substantial differences in the invention from this technology, primarily that, with these prior art techniques, the edges may not be clean and finished, and the material cut off is treated as scrap. This is not the case in the present invention where there is no scrap as a necessary condition, as described below.

SUMMARY AND ADVANTAGES OF THE INVENTION

The present invention utilizes state-of-the-art technology in computer control, gas flow, and lasers. This is an important advantage of the invention, in that no new, expensive or sophisticated equipment need be developed or used, but only simple modifications and adaptations of existing equipment are all that are required to implement the invention.

An important aspect of the invention is the use of a shielding gas. The invention works with an inert gas such as helium or argon, and not with oxygen. If oxygen were used in the invention, the oxygen would react with the molten metal at the site of the impingement of the laser on the work, which would cause the metal to oxidize, making the cut overly wide and producing rough edges. Use of a shield of inert gas, on the other hand, allows the cut to be very narrow, tightly controlled, and produces a very secure welded seam on the edge of the work.

This aspect of the invention also utilizes technology from laser cutting of metal wherein a high pressure, high-speed relatively thin jet of oxygen is used. It also utilizes technology from conventional laser welding wherein a relatively wide of stream of inert gas at relatively low pressure is used. Combining these two facets, the present invention uses a narrow jet of an inert gas to quickly blow away some of the molten metal leaving some of the molten metal at the laser site. This relatively narrow stream of an inert gas is an important aspect of the invention.

The high speed flow of shielding gas prevents the molten metal from coming together in the cut. By removing some of the metal and leaving some of the metal, a cut is made, while enough molten metal is left so that welds occur on both sides of the cut, and the edges produced are extremely smooth and finished. If all of the metal were left at the work site, the edges of the multiple sheets would be welded to each other, but the work would also weld back together across the cut, thus producing a result, wherein weld is formed, but the work is still joined together. This might be useful in some environment but would not be satisfactory in the environment in which the invention was developed.

The invention can thus be thought of as double-sided welding. That is, as the laser progresses the work, some of the molten metal is removed by the shielding gas flow, and the welding is caused to occur on both sides of the cut, parallel to the line of the cut or the line of progress or track of the laser on the work, by the remaining molten metal.

The present state-of-the-art of machine tools and computer controls is such that it is possible, without a great deal of trouble, to cause relative motion to occur between a laser and a work piece in three dimensions. The present invention utilizes such technology, which together with its ability to cut through varying thicknesses of metal at different locations on the same piece of work, allows the invention to produce substantial advantages over prior art methods, as described above.

An important advantage of the invention flows from the fact that the edges produced are smooth and finished on both sides of the cut or on both pieces of work. In the prior art, the cutting usually produces one edge on the work, usually ragged, and a piece a scrap. Because of the close tolerance to which the cut line can be produced and the fact that finished edges are produced on both sides of the cut, the invention is highly adaptable to applications wherein adjacent finished parts have edges which butt up against each other. With one pass of the laser along such a line, two separate finished parts each having a finished edge produced by this single pass can be generated. This is an important advantage of the invention and achieves large economic savings over prior art methods. In effect, the invention eliminates flash and waste, producing two finished edges on two adjacent work pieces simultaneously while cutting the pieces apart from each other and welding the seams on both pieces along the one line. In addition to savings of material as flash and waste time and related expenses are saved since one cut produces two finished edges.

Another advantage of the invention is that it is amenable to working with varying numbers of layers of material. In this respect, the primary limiting factor is the strength of the laser. That is, for example, if a particular laser can cut through a half-inch thickness of a particular material, for purposes of the invention that half-inch thickness could be made up of two quarter-inch thick layers, or ten layers each 0.050 inches thick, or combinations of various thicker and thinner layers, and the like.

As to different kinds of metals and different kinds of lasers, the invention utilizes all of the developments of the state-of-the-art. That is, if it is known that a particular kind of metal is welded better by a particular kind of laser, then that same combination will operate best in the invention method of simultaneously cutting and welding.

The invention is also flexible and generates advantages in regard to the nature of the work and the number and combinations of the layers. For example, if part of th work to be cut and welded has a portion that is four layers thick, and the bulk of the work is only two layers thick, the invention control technique can be adapted to do all of the cutting and welding, through all of the different thicknesses of metal, with no changes at all as to the operating parameters of the laser itself or as to the operating parameters of the shielding gas. The different thicknesses of metal are easily accommodated by slowing down the relative speed of the progress of the laser with respect to the work. That is, the laser would be caused to go slower, under automatic control, through the thicker parts, and then at a higher normal speed through the thinner parts. The advantage here is that the relatively much more difficult tasks of changing gas pressures and changing the strength of the laser would not have to be accomplished, and the same gas pressures and laser strength would be used throughout the work even though many different thicknesses of metal would have to be cut at different parts of the work. Here again, this is a very substantial advantage for the invention with respect to the prior art.

Another parameter to be controlled is the spacing between the layers to be cut and welded, this spacing being the distance measured parallel to the laser beam through the work. The primary consideration is the size of the globule of molten metal. This will be determined by numerous parameters in any particular project, including the strength of the laser, the width of the cut, the quantity and pressure of the shielding gas, the type of metal, and the like. In usage of the invention, the spacing needs to be such that this globule will bridge the gap and form a weld. The jet of inert gas tends to reduce the size of the globule because it tends to blow the globule away through the cut. There are in the laser metal cutting arts numerous formulas and other criteria which can be utilized in the invention method of simultaneously cutting and welding. However, in the present invention, the distances, that is the spacing, will be smaller because in such formulas as applied to cutting the goal is to entirely blow away the globule, whereas in the present invention the globule is used also to weld, and only part of it is to be removed.

The present invention method operates based on a surface tension phenomenon. That is, the welding on both sides of the cut is done utilizing the surface tension of the globule or puddle of molten metal. The center of this globule is blown away, and the surface tension causes the remainder of the pool of molten metal to move parallel to the beam to thereby weld both sides of the work, that is to weld the work on both sides of the cut line.

This surface tension phenomenon produces an additional advantage. It causes the invention system to be virtually immune to gravity. The relatively small mass of molten metal does not respond nearly as much to gravity as it does to the much stronger forces caused by the surface tension of the globule. This immunity from gravity permits the invention to work well in all three dimensions, which permits use of the invention system to produce parts having portions in all three dimensions and permits the generation of such work in one continuous operation of the laser around the work.

The invention is thought to be able to work with various different thicknesses of metal because the bridging effect occurs only at the spaces between the layers, and thus does not depend upon the thicknesses of the layers. It is for this reason that it is thought the invention will operate with any number of layers in any total thickness up to the capacity of the strength of the particular laser in use. Another limiting factor however is that it is thought the invention will not operate well with extremely thin layers, in that, in the manner of plastics, such extremely thin layers may vaporize and/or curl and not function properly in accordance with the methods of the invention.

In this regard, reference may be had to standard texts as to laser cutting and welding, for example, attention is invited to the following references:

*Laser Welding at* 1580 ipm, American Machinist & Automated Manufacturing, John A. Vaccari, March 1987, pp. 75–76;

*Laser Cutting of Thin Materials*, Electronic Systems Group, GTE Sylvania Inc., Simon L. Engel, October 1974, pp. 207–215; and

*Welding*, Technical Paper MR74-962, SME, 1974, pp. 355–359.

DESCRIPTION OF THE FIGURES OF THE DRAWING

The invention will be better understood with reference to the attached drawing also forming part of this disclosure, wherein:

FIGS. 4A to 4D are a family of drawings similar to the showings of FIGS. 2 and 3 but illustrating the invention method of simultaneously cutting and welding metal sheets;

FIG. 5 is a drawing similar to FIG. 4D showing the manner in which the invention method can simultaneously cut and weld multiple sheets of material of different thicknesses; and FIGS. 6A to 6C are a family of drawings showing another facet of the invention.

DETAILED DESCRIPTION OF THE PREFERRED EMBODIMENTS

Figure 1:
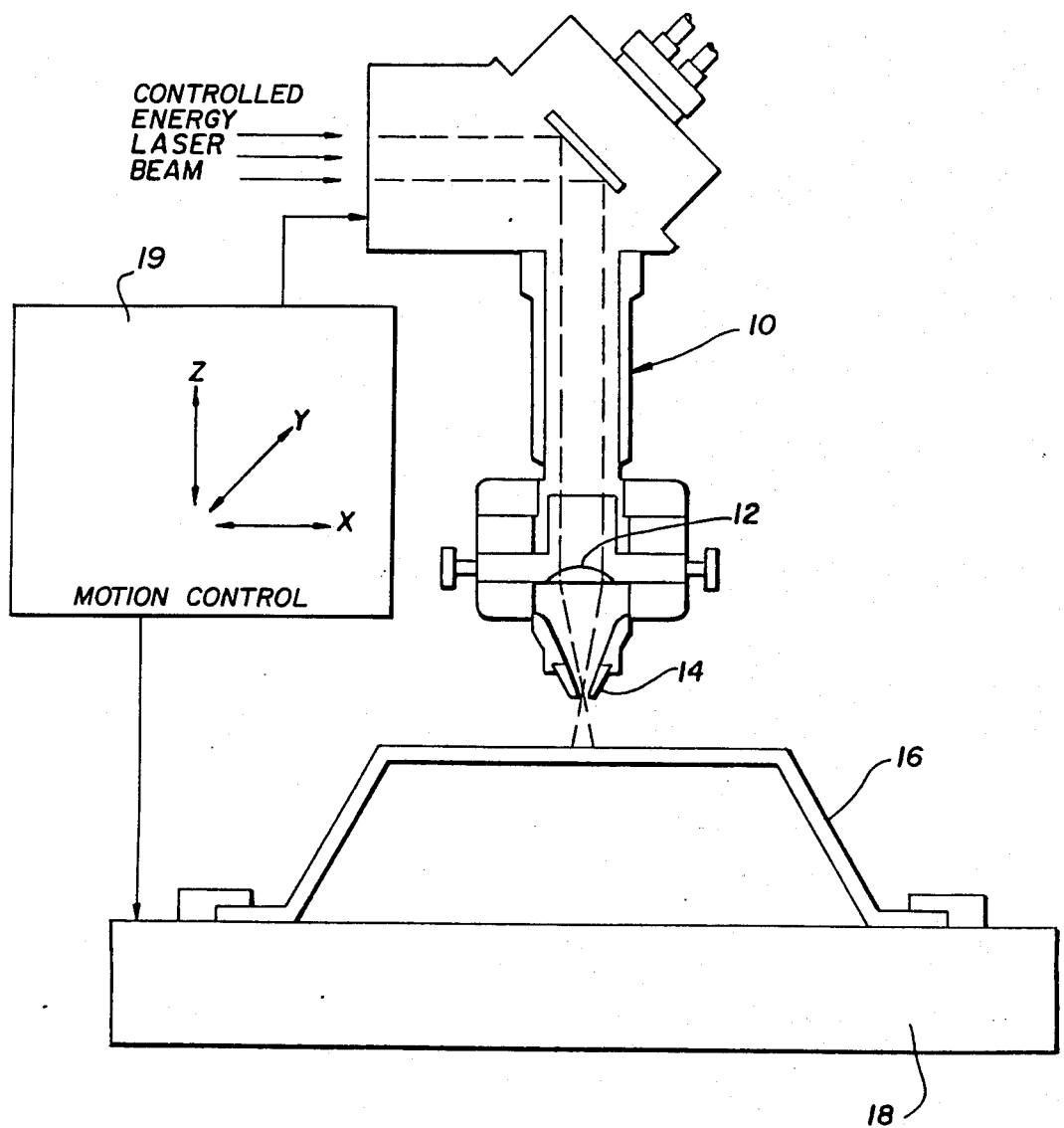
FIG. 1 is a schematic elevational view showing a generalized set-up for practice of the invention method of simultaneously cutting and welding metal.

Referring now to FIG. 1, a laser work head 10 directs the laser beam from a conventional source through a lens 12 and a nozzle 14 described in greater below, onto a work piece 16 which is held on a table 18. It is to be noted that the work 16 exists in three dimensions, that is, it is a three-dimensional article. The coordinate system X, Y, and Z indicated on FIG. 1 illustrates the fact that relative motion is caused to occur between the work 16 and the nozzle 14 in all three dimensions. This can be accomplished, using conventional technology, by having the head 10 fully articulated in all three directions, or by having the table so articulated, or by combinations thereof. For example, the table 18 could be free to move in the X and Y plane, and the head 10 be free to move in the Z direction and at various angles. Block 19 marked MOTION CONTROL if FIG. 1 indicates such means as used in the invention.

The lens 12 is preferably of a five-inch focal length in the particular embodiment with which the invention has been successfully used. The focal point can be set to be at the surface of the work, or below the surface. For relatively thin materials, the focal point would be set at the surface of the work 16. For relatively thicker materials, the focal point might be set, for example, up to 0.020 inches below the surface.

As a particular example where two sheets of stainless steel each 0.005 inches thick are to be cut and welded, the nozzle is set at about 0.080 inches above the work surface and is provided with an orifice of 0.040 inches, and helium is used as the shielding gas and is caused to flow at 45 cfm. The relative working speed between the work 16 and the laser 10, which can be accomplished by movement of either one or both of these elements as described above, is caused to be approximately 20 inches per minute.

If any part of the work piece 16 had three, four, or more thicknesses of such sheets of stainless steel to be cut and welded, as might occur at corners or irregular sections of the work, in that case, the strength of the laser and the gas flow can be left unchanged but only the speed, that is the 20 inches per minute, could be made slightly slower as the laser moves relative to such thicker areas. This is relatively simple to accomplish in the computer control of the motion of one or both of the laser head 10 and/or the work table 18.

Referring now to FIG. 2, the prior art method of cutting metal using a laser with an oxygen assist is illustrated. FIG. 2E is taken on line 2E—2E of FIG. 2C.

The drawings of FIG. 2 show a nozzle 20 containing a focusing lens 22 and a work piece 24 which is to be cut. A stream of oxygen as indicated is provided through the nozzle 20 to impinge upon the work.

For the sake of this example, it may be assumed that the work 24 is 0.125 inches thick and it is desired to produce a cut 0.005 inches wide. The nozzle 20 will have 0.030 inch diameter to thereby apply a high-speed, high pressure jet of oxygen to the cut.

Figure 2A:
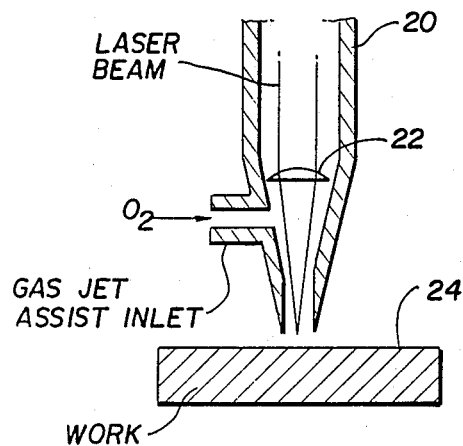
FIGS. 2A through 2E are a family of drawings indicating the prior art method of cutting metal using a laser with an oxygen jet assist.
Figure 2B:
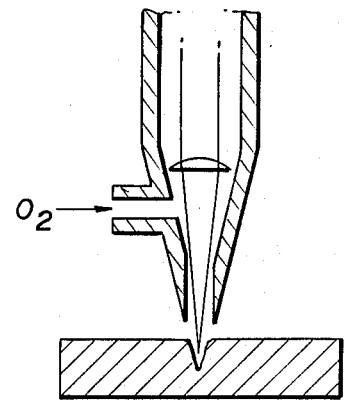
Figure 2C:
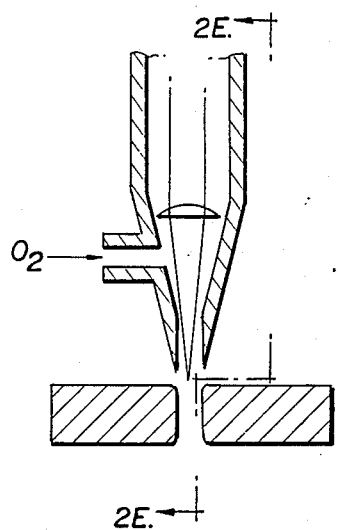
Figure 2D:
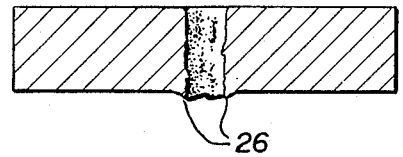

FIG. 2A shows the beginning of work. FIG. 2B shows partial penetration, the molten material being entirely blown out of the cut by the high-speed flow of the oxygen. FIG. 2C shows the moment of penetration at which the molten metal in the cut is blown out of the bottom. FIG. 2D shows the cooled material after the laser has passed. In particular, the ragged edges 26, having hanging bits of metal, oxidized material, and the like, should be noted, this being an inherent quality of laser cutting with an oxygen assist. It is caused in part by the oxidation of the material at the sides of the cut. These ragged edges 26 are extremely undesirable in general. They are unacceptable in the environment for which the invention was developed and they are avoided with the use of the present invention.

Figure 2E:
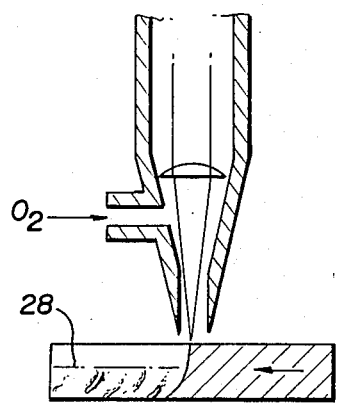

In FIG. 2E, the imaginary line 28 shows the difference between the relatively smoother upper part of the cut which is created by the laser energy primarily, and the much more ragged lower part of the cut below the line 28 which is in effect a flame cut edge. This is an advantage for this technology in its normal areas of application. That is, the use of the oxygen substantially increases the depth of the cut with respect to the depth of cut that could be achieved with the laser energy alone. However, the ragged edge 26 is totally unacceptable in the environment of the present invention, as well as the lack of control of the cut line and the oxidation of the material at the cut line.

Figure 3A:
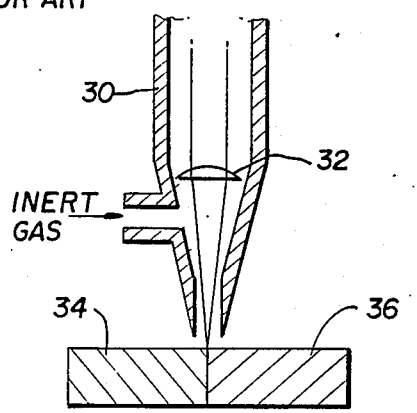
FIGS. 3A through 3E are a family of drawings showing the prior art method of welding metal using a laser and an inert gas shield.
Figure 3B:
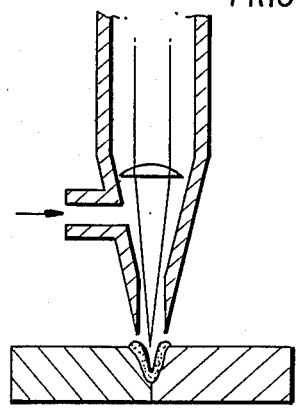

The drawings of FIGS. 3A to 3E illustrate conventional laser welding, which is also called "keyhole" welding. In this conventional prior art technology a low velocity shield of an inert gas is used. The Figures show a nozzle 30 containing a lens 32 which focuses the laser on the seam between two pieces of work 34 and 36 to be welded together. The work pieces are 0.125 inches thick, and the focal point of the laser beam using the lens 32 is set to 0.030 inches below the surface of the work. FIG. 3A shows the two pieces to be joined and the initial set up at the beginning of welding. FIG. 3B shows the material partly melted through and with a lining of molten material at the weld site.

Figure 3C:
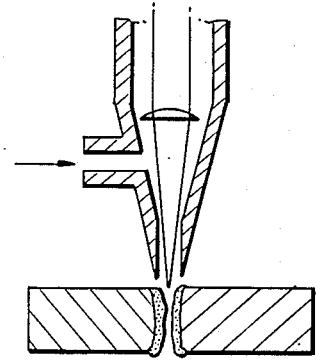
Figure 3D:
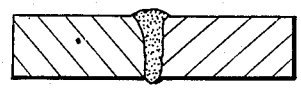

FIG. 3C shows the work piece melted through but with the molten material clinging to the sides due to surface tension. A cavity is caused by the loss of a small amount of the metal during the operation. FIG. 3D shows the flowing together of the molten metal to form the weld after the laser has passed further on along the weld line.

Figure 3E:
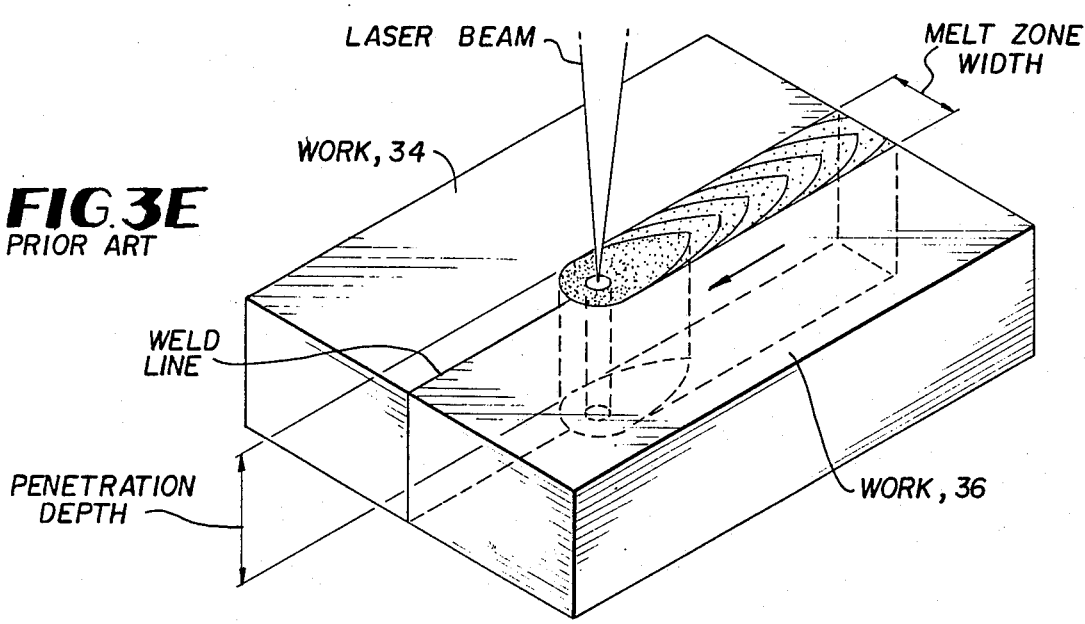

FIG. 3E is a somewhat schematic and somewhat perspective view illustrating conventional laser welding. The puddle of metal collapses into a fused weld behind the active area being impinged upon by the laser beam. The relative motion between the laser and the work in FIG. 3E is from the upper right to the lower left as indicated by the arrow.

Other parameters surrounding the operation of conventional welding as shown in FIGS. 3A–3E include that the focal point of the beam is set to occur approximately 0.030 inches below the surface of the work pieces 34 and 36. In order to get the low velocity flow with minimum blowing away of the molten metal, a nozzle diameter of 0.100 inches is used. The beam diameter is also relatively wide, on the order of 0.010 inches. The resulting weld shown in FIG. 3D will have a diameter on the order of 0.050 inches.

FIGS. 4A, 4B, and 4C are views similar to those of the families of FIGS. 2 and 3, but they illustrate the invention.

The work 16 is shown as being made up of two layers 38 and 40 separated by a space 42. In the testing which has been done so far in order to prove the invention, the layers 38 and 40 have been stainless steel and in the range of 0.002 to 0.010 inches thick each. The thickness of the space 42 is governed by many factors, including the speed of working, the energy of the laser, the parameters surrounding the shielding gas, the particular type of metal, and the like. In the testing done so far in proving the invention, it has been found that the thickness of the space 42 should be on the order of ten percent of the thickness of the thinnest layer 38, 40, or the like to be welded. However, this is indicated only by way of a full disclosure of the work done so far. It is believed that this thickness can change considerably depending upon the various factors in a particular environment. For example, although a space 42 is shown in the Figures, the two layers 38 and 40 could be in contact with one another if the work being done requires it. In most applications, however, it will be impractical to have the two layers 38 and 40 in contact. The spacing also illustrates that the invention is very forgiving, i.e. welding across gaps of 0.008 inches have been done with ease. The critical criterion is that it not be too large to prohibit the bridging over of the globule on the sides of the cut line, that is, that it form the condition shown in FIG. 4C.

FIGS. 4B and 4C show the ideal working conditions of the method of the invention. In FIG. 4B, the shielding gas and the laser have created a cavity 44 which is surrounded by a melt zone 46, and the melt zone 46 has formed a protrusion 48 at the bottom which is about to break through. FIG. 4C shows the condition after breakthrough and after the laser has passed by this particular work site. After breakthrough, the surface tension in the two halves of the melt zone 46 cause them to retract due to the surface tension on each side, forming rounded continuous beads 50. These beads 50 are the finished edges, cut and welded, in accordance with the invention. The shield gas prevents oxidation of these finished edge beads 50.

The lens 12 is used to focus the laser beam at the surface of the work 16 or up to 0.020 inches below the surface, depending upon the thickness of the material, the speed of the jet of inert gas, and the like.

The cavity is created by the energy of the laser and the flow of the inert gas analogous to the manner in which this is done in laser cutting and welding as described above in regard to FIGS. 2 and 3 and the prior art.

In the successfully conducted testing of the invention some of the parameters of the arrangement of FIGS. 4A, 4B, and 4C were a relative cutting speed of 70 inches per minute, a continuous wave $CO_2$ laser was used in a gaussian mode (TEMoo), a delivery optic made of zinc selenide was used having a 3.750 focal length by 1.100 lens with the focal point at the surface, and helium was used as the inert gas and was provided at a pressure of 5 to 8 psi through a nozzle of 0.040 diameter. The material used in this test was 304 stainless steel, 3×1×0.004 inch; good results were obtained up to 0.012 inches thick; but the cut was not clean at 0.016 inches.

FIG. 5 illustrates the fact that the invention can be used to simultaneously cut and weld large numbers of thicknesses of sheet metal. By way of example, three layers 52, 54, and 56 separated by two spaces 58 and 60 are shown. A bead 50A analogous to the bead 50 described above in regard to FIG. 4 is formed to simultaneously cut and weld the work 16A. The spaces 58 and 60 can be of varying sizes, and the thicknesses of the layers 52, 54, and 56 can vary, all in accordance with the teaching of the invention as set forth in more detail herein.

Referring now to FIGS. 6A, 6B, and 6C, there is shown in FIG. 6A a plurality of work pieces 62 each of which has a hexagonal base and a dome top which define a space between themselves. As shown in FIG. 6C, the space may be filled with insulating material 64, in which case the parts 62 will serve as some sort of heat insulator. If the space within each part were left empty, the part 62 could serve as a hollow sealed pressure sensing chamber. As is clear, the invention is extremely well adapted to produce large quantities of the part 62 by simultaneously cutting and welding along the hexagonal base lines, each cut serving to produce two finished surfaces, one on each of two adjacent parts 62. In this manner, a very large number of finished parts can be produced continuously and automatically from laid up sheets, one of these sheets serving as the base and the other serving as a plurality of the domes or hemispherical tops of the parts 62.

While the invention has been described in some detail above, it is to be understood that this detailed description is by way of example only, and the protection granted is to be limited only within the spirit of the invention and the scope of the following claims.

I claim:

1. Apparatus for simultaneously cutting and welding at least two sheets of metal overlaid on each other comprising means for producing a laser beam, motion control means for subjecting the areas of said overlaid sheets along a line of progress where they are to be cut and welded to the laser energy in said beam, means for providing a shield of inert gas around said laser beam; and means for selecting the operating parameters of at least said inert gas shield, said laser energy, and the speed of progress of said laser beam along said line of progress with respect to said sheets and with respect to at least the number, thicknesses and types of metals in said sheets so that the relatively narrow melt zone and cut is created along said line of progress of said laser beam on said sheets so that surface tension in said melt zone after breakthrough will cause said melt zone on both sides of said line of progress to form smooth beads on the cut edges of said sheets on both sides of said line of progress.

2. The apparatus of claim 1, wherein at least two of said sheets of metal are overlaid on each other with a predetermined space between said two sheets, and means for causing said predetermined space to be equal to about 10 percent of the thickness of the thinnest of said at least two sheets of metal.

3. The apparatus of claim 1, wherein a workpiece is made up of least two of said sheets of meal and is formed so that at least two thicknesses of metal are present at most locations where said simultaneous cutting and welding is to occur and so that at least three thicknesses of said sheets are present at some locations where said simultaneous cutting and welding is to occur, and means for slowing the speed of progress of said laser beam with respect to said workpiece in said locations having at least three more of said thicknesses with respect to a faster said speed of progress at most of said locations having only two of said thicknesses, whereby said entire workpiece may be worked upon with changes in only said speed of progress and with no changes in other operating parameters including said laser energy in said beam and the operating parameters of said shield of inert gas.

4. The apparatus of claim 3, and means for automatically making said changes in said speed of progress.

5. The apparatus of claim 3, wherein said workpiece exists in three dimensions and is worked upon by said laser beam in all three dimensions, and means for causing relative motion between said workpiece and said laser beam to cause said beam to follow said line of progress in all three dimensions.

6. The apparatus of claim 1, wherein said line of progress extends in all three dimensions, and means for causing relative motion between said overlaid sheets and said laser beam to cause said beam to follow said line of progress in all three dimensions.

7. The apparatus of claim 1, wherein said metal sheets are formed of 304 stainless steel each of a thickness of 0.004 inches, wherein two such sheets are to be worked upon in most of the areas to be simultaneously cut and welded, said means for producing a laser beam comprising a continuous wave $CO_2$ laser, and the operating parameters of said laser and said shielding gas are selected as follows: for said continuous wave $CO_2$ laser, 3.75 focal length lens by 1.1 of zinc selenide, focus at surface; and for said shielding gas, Helium as the inert gas at 5 to 8 psi via a 0.040 diameter nozzle.

* * * * *